United States Patent [19]

Stevens

[11] 4,268,331

[45] May 19, 1981

[54] METHOD FOR MAKING A FLUID FILLED RING

[76] Inventor: James N. Stevens, 1811 N. Orleans St., Chicago, Ill. 60614

[21] Appl. No.: 4,980

[22] Filed: Jan. 19, 1979

Related U.S. Application Data

[63] Continuation-in-part of Ser. No. 916,081, Jun. 16, 1978, Pat. No. 4,194,746.

[51] Int. Cl.³ .............................................. F16J 15/46
[52] U.S. Cl. .................................... 156/145; 156/146; 156/147; 156/304.2; 277/26; 277/34.3; 277/226
[58] Field of Search ............... 156/145, 146, 147, 304, 156/80, 83; 200/34, 26, 34.3, 226, 227, 228

[56] References Cited

U.S. PATENT DOCUMENTS

| | | | |
|---|---|---|---|
| 1,915,660 | 6/1933 | Gammeter | 156/81 |
| 1,998,915 | 4/1935 | Young | 277/26 |
| 2,688,436 | 9/1954 | Melaven | 277/226 |
| 3,007,600 | 11/1961 | Horner | 277/26 |
| 3,491,825 | 1/1970 | Peterson et al. | 277/34.3 |

*Primary Examiner*—Caleb Weston
*Attorney, Agent, or Firm*—Gregory B. Wood

[57] ABSTRACT

A fluid filled ring for a shaft sealing apparatus in a machine casing or container wall through which a rotatable shaft passes. The sealing apparatus comprises a housing fixed about its exterior surface to the machine casing. The housing defines an interior chamber in which one or more seals are positioned about the shaft. Each seal comprises a mechanical packing encircling and in contact with the shaft and an elastomeric compression ring positioned to encircle the mechanical packing.

The elastomeric ring is fluid filled and may be made by the steps of cooling a fluid; filling an elastomeric tube with the cooled fluid; clamping the ends of the tube to confine the fluid; increasing the temperature of the fluid filled clamped tube causing the tube to expand in response to expansion of the fluid; creating a weld between the ends of the clamped tube to form a hermetically sealed ring; removing the clamps for allowing the fluid to fill the resultant ring chamber so that the elastomeric material returns to its substantially unexpanded state.

6 Claims, 5 Drawing Figures

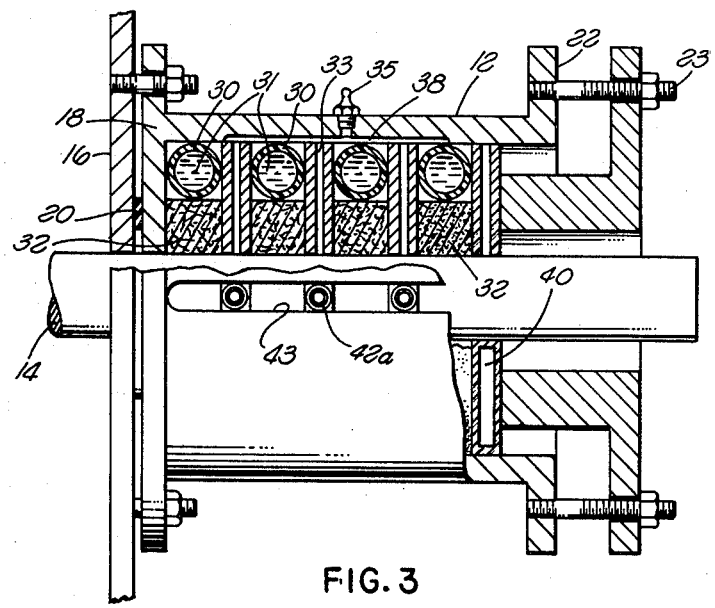
FIG. 3
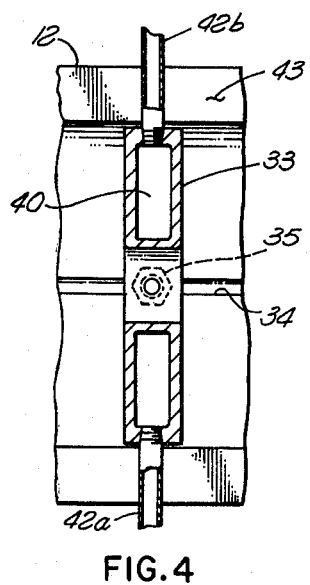
FIG. 4
FIG. 5B
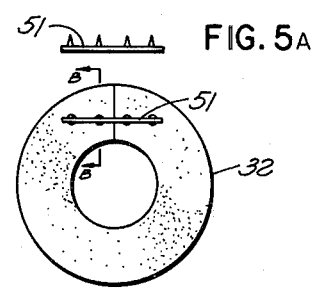
FIG. 5A
FIG. 5

METHOD FOR MAKING A FLUID FILLED RING

CROSS-REFERENCE TO RELATED APPLICATION

This is a continuation-in-part application of copending application Ser. No. 916,081, filed June 16, 1978, Pat. No. 4,194,746.

BACKGROUND OF THE INVENTION

Hitherto, shafts have been sealed by means of conventional stuffing boxes, including mechanical packings consisting of annular gaskets compressed by annular gland followers moved axially against the packing, thereby converting axial force to radial components of force. A large proportion of the axial force is consumed in compression of the mechanical packing. Mechanical packing takes the shape of the restraining container and is subjected to deformation due to eccentric rotation of the shaft. The resulting phenomena is termed "pumping the seal."

The second generation in development of conventional stuffing boxes included pressurized diaphragms having an independent source of fluid pressure, usually fluid from the discharge side of a pump or an air compressor. These diaphragm seals proved unsatisfactory for several reasons: sealing pressure failed during power failures; temperature tended to build up due to frictional heat causing the enclosed fluid to expand in an uncontrollable manner; the mechanical arrangement of the seals did not permit flushing or lubrication of the shaft at the packing interface.

In contrast to prior art relating to shaft sealing devices, the present invention provides means for applying direct radial force to mechanical packing by compressing the fluid in a hermetically sealed, self-contained elastomeric ring by converting mechanically applied axial pressure to hydraulic pressure by deforming the ring. The eccentric motion of a rotating shaft is then compensated for by relocation of the fluid within the elastomeric ring. A self-centering sealing means is thus provided.

The present invention incorporates this feature to provide uniform sealing pressures to multiple compartments in a single seal cartridge.

The number of compartments required in a single seal is related to the operating pressure of the apparatus or machine to which it is attached.

An indirect, non-wetting cooling means is provided for simultaneously cooling the mechanical packing and the elastomeric ring adjacent to the cooling means.

SUMMARY OF THE INVENTION

The method of fabrication of the self-contained fluid filled elastomeric ring is accomplished without the use of either filling or vent valves by first chilling a fluid to a predetermined temperature. A tubular element, which may also be cooled, is then filled with the fluid in a moisture and carbon dioxide-free atmosphere and thereafter clamped at both ends to retain the fluid. The fluid used to fill the tube may be a polyaromatic compound, a modified ester, a dextrose solution or other solution which has a volume change, preferably in the range of seven to ten percent, as the fluid is heated from its cooled temperature to its welding temperature. Thus, when the temperature of the clamped tube is raised to a selected welding temperature, the fluid and thus the elastomeric tube expands. The clamped ends of the tube are then welded utilizing an appropriate welding agent such as a cyano acrylate. One particular preferred welding agent is esterified cyano acrylate. The joined ends of the tube are then unclamped thereby providing additional volume into which the enclosed fluid flows. The tube thereupon returns to a substantially unexpanded state.

The resultant fluid filled ring may be utilized in a shaft sealing apparatus useful for confining liquids, dry solids and slurries in a machine casing through which a rotatable shaft extends. The sealing apparatus has a housing fixed to the machine casing for providing a confining chamber around the shaft. One or more seals are then positioned axially along the shaft in the housing. Each seal comprises an annular mechanical packing encircling and in contact with the shaft and an elastomeric, fluid filled compression ring, described above, which is positioned to encircle the mechanical packing. A gland follower is then used to exert a substantially equal longitudinal force to each longitudinally positioned seal. The mechanical packing and the elastomeric ring are thus longitudinally compressed, causing the elastomeric ring to deform to cause a radial force to be exerted against the mechanical packing.

BRIEF DESCRIPTION OF THE DRAWINGS

A complete understanding of the present invention and of the above and other objects and advantages thereof may be gained from a consideration of the following description of the preferred embodiments taken in conjunction with the accompanying drawings in which:

FIG. 3 is illustrative of an embodiment of the invention having multiple longitudinally positioned seal means.

FIG. 4 is a vertical section of a hollow compartment spacer used for the purpose of transporting cooling fluid for indirectly cooling the compression rings and packing.

FIGS. 5, 5A, and 5B are illustrations of the closure pin arrangement at the abutting ends of the mechanical packing rings.

DETAILED DESCRIPTION

Figure 1:
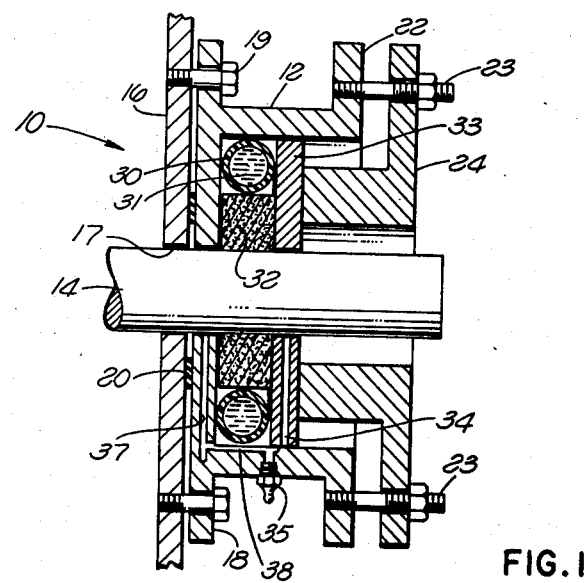
FIG. 1 is a central vertical section, cut axially through the central portion of a protruding shaft communicating through the machine casing and the shaft seal with the seal in a non-compressed state.

Referring to the drawing in detail, FIG. 1 shows a screw conveyor, or other type of process equipment 10, provided with a radially compressed shaft seal housing 12 in accordance with the invention. The seal apparatus has an interior chamber through which extends a rotatable shaft 14. A conventional helical screw conveyor or other type of conveying, mixing or pumping machine (not shown) is then attached to the end of the shaft 14. The machine has a casing or container plate 16 with a shaft bore 17 through which the rotatable shaft extends. A vertical wall 18 of the housing 12 may be bolted with bolts 19 to the plate 16 with gasket seal 20 intervening therebetween. The seal housing 12 is preferably centered on shaft 14 to minimize eccentricity. The housing 12 has an integral bolting flange 22 which is tapped to receive compression bolts 23 which in turn, support a gland follower 24.

A seal is positioned in the housing chamber between the shaft 14 and the housing 12. The seal comprises an annular mechanical packing 32 encircling and in contact with the shaft 14 and an elastomeric compression ring 30 filled with a fluid 31 is positioned to encircle the mechanical packing material 32. An annular bearing plate 33, which may be a compartment spacer, to be hereafter described, is positioned for applying longitudinal pressure to the compression ring 30 and mechanical packing 32 when the gland follower 24 is moved forward by tightening bolts 23. The bearing plate or spacer 33 may be drilled for defining a passageway 34 which opens onto the surface of the shaft 14. A passageway 37 may also be provided in the vertical wall 18 of the housing 12. A lubricating compound may then be forced through the passageways 34 and 37 and onto the surface of the shaft 14. A lubrication fitting 35 may be threaded into an interconnecting passageway 38, communicating between the passageways 34 and 37.

In operation bolts 23 are tightened for providing longitudinal compression to the mechanical packing 32 and the fluid filled elastomeric ring 30 so that the ring 30 and the mechanical packing 22 take the shape of the chamber between the shaft 14, the housing 12, and the bearing plate or spacer 33. The ring 30 thereupon deforms and exerts a uniform radial compression force on the mechanical packing 32, causing the mechanical packing to press uniformly on the surface of rotating shaft 14 thereby creating the seal. In operation, any eccentric rotation of shaft 14 has the effect of relocating the fluid 31 in the fluid filled elastomeric ring 30. The ring thus adapts the seal to the changing center of rotation so that even though the center of rotation of shaft 14 changes, the radial forces on the mechanical packing 32 remain constant.

Figure 2:
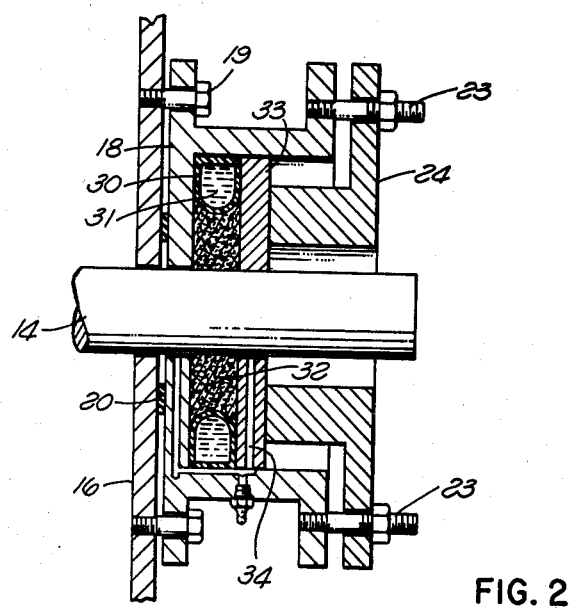
FIG. 2 illustrates the seal of FIG. 1 in a compressed operating state.

FIG. 2 is a representation of the deformation of the fluid filled elastomeric ring 30 and the mechanical packing 32. The mechanical packing material 32 is compressible and is invaded by the compression ring 30 to form a concave groove at the interface. The effect is to increase the bearing area of the materials and prevent rotation of the packing material with rotating shaft 14. A pressure seal is thus formed between the compressed fluid filled elastomeric ring 30 and the vertical faces of the bearing plate or spacer. Referring to FIG. 3, a multiple seal embodiment is illustrated where the number of seals used is determined by the operating pressure of the vessel system. When indirect cooling of the seal internals is desired, each compartment spacer 33 may be fabricated to have a hollow enclosed interior 40 (FIGS. 3 and 4) through which a coolant may be circulated. Hydraulic pressure developed in the fluid filled elastomeric cmpression rings 30 when tightening bolts 23 is uniformly transmitted to each separate seal comprising a compression ring 30, mechanical packing 32 and a compartment spacer 33. The radial force is therefore substantially equal at the packing and shaft interface at each compartment. Thus, the compartment spacers 33 may be hollow rings each ring having, for example, an ingress opening 42a and discharge opening 42b through which a coolant respectively enters and exits the chamber. Longitudinal slots in the housing 12, such as slot 43, allow for axial movement of the openings or ports 42a and 42, as the spacers move longitudinally in response to the pressure applied by the gland follower 24 as the bolts 23 are tightened. A coolant may then be provided to circulate through the chamber 40 in the spacers 33 to cool the mechanical packing 32 and the fluid 31 in the ring 30.

In practice it has been found that simultaneous deformation of the mechanical packing 32 and the compression ring 30 result in an unpredictable flow of the pliant packing material within each seal compartment or chamber. The resulting gap at the point of abuttment thus violates the integrity of the seal. Thus, as shown in FIG. 5, the abutting ends of the mechanical packing 32 are secured in a fully completed circle by closure pins 51.

The fluid filled elastomeric compression ring may be made by first providing a length of elastomeric tubing which is preferably cooled to a selected temperature. A similarly cooled fluid such as polyaromatic compound, a modified ester, a dextrose solution or any other appropriate fluid is then used to fill the cooled elastomeric tubing preferably in a moisture and carbon dioxide-free atmosphere. The elastomeric tubing is then clamped at both of its ends to confine the fluid in the tubing, preferably so that there are no air pockets or bubbles in the interior of the clamped tube. The temperature of the clamped fluid filled tube is then allowed to increase. The particular fluid and the temperature to which the fluid and the tubing are cooled are selected so that when the temperature of the fluid filled clamped tube is increased to a pre-selected welding temperature which may, for example be ambient room temperature, the volume of the confined fluid will have increased in the range of seven to ten percent. Because of this increase in the fluid volume, the elastomeric tubing expands to have an interior confining volume sufficient to contain the expanded fluid volume.

After the fluid clamped elastomeric tubing has reached the desired welding temperature, a selected welding compound such as cyano acrylate and preferably esterified cyano acrylate, is used to weld the clamped ends of the fluid filled tubing together to form a ring. Upon completing the weld, the clamps are removed and the fluid allowed to expand into the previously clamped area of the elastomeric ring. The elastomeric tubing which was in a stretched or expanded volume state prior to unclamping, returns to its substantially unstretched state after the clamps are removed because of the increased interior volume capacity of the unstretched elastomeric tube.

The present invention thus provides a novel fluid filled ring substantially devoid of air bubbles or spaces in the interior portion of the ring.

This invention has been described and illustrated in the drawings as applied to rotating shafts; however, it would also be evident to those skilled in the art that it is equally applicable to sealing of reciprocating shafts.

A further application would include sealing shafts where the sealing surface changes relative location with respect to the fixed positioned sealing device as demonstrated for example by a rising stem valve.

The materials of construction for use in fabricating the compression rings are natural and synthetic elastomers and should be compatible with the entrapped fluid as well as the processed material in the vessel to which it is attached.

The wearing part of the sealing device is the mechanical packing material 32. To replace the mechanical packing, it is unnecessary to unbolt the entire housing 12. By removing the gland follower 24 and retracting the individual compartments and the removal of the contents is readily accomplished. New mechanical packing material is inserted under the appropriate compression ring 30 starting from the innermost compartment. The individual seals can be simply pushed into place.

What is claimed is:

1. The method of fabricating a liquid filled bubble rings ring comprising the steps of:
   (1) providing an elastomeric tube
   (2) cooling a quantity of liquid to a first temperature for decreasing its volume,
   (3) filling the tube with the quantity of cooled liquid at its decreased volume,
   (4) confining the cooled liquid in the tube using clamps on the ends of the tube for defining a confined closed ended chamber entirely filled with the quantity of cooled liquid,
   (5) increasing the temperature of the quantity of the cooled liquid from the first temperature to a second temperature for expanding the volume of the liquid thereby causing the tube to expand to accommodate the increased volume of the liquid according to the coefficient of expansion of the liquid,
   (6) fusing the ends of the tube together with an adhesive, and
   (7) removing the clamps for creating an enclosed non-obstructed ring chamber, whereupon the tube relaxes from its expanded state and the quantity of liquid flows into the previously clamped region of the ring chamber for filling the entire enclosed ring chamber.

2. The method of claim 1 wherein the second temperature is ambient room temperature.

3. The method of claim 1 wherein the quantity of liquid is selected for having a first volume at the first temperature and a second volume at the second temperature, the second volume being in the range of about seven to ten percent larger than the first volume.

4. The method of claim 3 wherein the liquid is selected from the group of polyaromatic compounds, modified esters and dextrose solutions.

5. The method of claim 1 wherein the step of fusing comprises providing a cyano acrylate compound around the end regions of the elastomeric tube and joining the ends, the cyano acrylate forming a bond for holding the ends together.

6. The method of claim 5 wherein the cyano acrylate compound is esterified cyano acrylate.

* * * * *